United States Patent [19]

Cohen

[11] Patent Number: 4,846,435
[45] Date of Patent: Jul. 11, 1989

[54] SUPPORT RAIL SYSTEM FOR STACKED COMPONENTS

[76] Inventor: Henry B. Cohen, 2459 Eighth St., Fort Lee, N.J. 07024

[21] Appl. No.: 199,442

[22] Filed: May 27, 1988

[51] Int. Cl.⁴ .............................................. A47B 91/00
[52] U.S. Cl. .................................... 248/346; 206/511; 206/821; 211/59.4
[58] Field of Search ............... 248/346, 678; 211/59.4, 211/26; 108/53.1, 53.5; 206/511, 821

[56] References Cited

U.S. PATENT DOCUMENTS

| | | | |
|---|---|---|---|
| 3,704,848 | 12/1972 | Trebes et al. | 248/346 X |
| 3,877,671 | 4/1975 | Underwood et al. | 248/346 |
| 3,982,638 | 9/1976 | Lamson | 206/511 X |
| 4,116,344 | 9/1978 | Ziemba | 248/346 X |
| 4,638,867 | 1/1983 | Pendleton et al. | 248/346 |
| 4,738,425 | 4/1988 | Foster | 248/346 |

Primary Examiner—Ramon O. Ramirez
Attorney, Agent, or Firm—Samuelson & Jacob

[57] ABSTRACT

A support rail system for use in supporting individual components having different longitudinal lengths, such as audio and video home entertainment components, in a vertical stack of such components with the front panels of the components flush with one another, includes support rails for interposition between adjacent upper and lower components and having a longitudinal extent long enough to project beyond the rear of a longitudinally shorter component which supports a longitudinally longer component so that the longer component will be supported fully upon the support rail which, in turn, will be supported by the shorter component in a stable, aesthetically pleasing stack.

18 Claims, 3 Drawing Sheets

SUPPORT RAIL SYSTEM FOR STACKED COMPONENTS

The present invention relates generally to supports and pertains, more specifically, to a support system for stacking components, such as audio, video and other home entertainment and home appliance components, in an orderly and aesthetically pleasing grouping, as well as in an economical and a functional arrangement.

The proliferation of electronic components designed for use in the home for entertainment as well as for more utilitarian purposes has led to the development of a variety of cabinets, racks, shelving systems and the like created for the purpose of installing and using these components in the home. Since these components usually are made available with individual housings of their own, many users prefer merely to stack the components, one upon another, to build a complete system of selected components, such as an audio or video entertainment center. However, since the components themselves are constructed in various dimensions, especially in the front-to-back dimensions, it is not always feasible to create a stack with a particular desired sequence of components in the stack. For example, a longer component may not necessarily find an appropriate purchase upon a shorter component and thus could not be placed immediately above the shorter component. Moreover, while it is desirable, both from the standpoint of function and appearance, to have a stack in which the front panels of all of the components in the stack are flush, that is, where all of the front panels lie in a common vertical plane, the varying front-to-back dimensions can preclude such an arrangement. Another disadvantage of stacking these components one upon another is that heat generated during use of the components may not be dissipated as readily as may be required for proper operation of the components.

Accordingly, the present invention provides a support rail system for enabling the stacking of audio and video components and the like, one upon another in a vertical stack the support rail system having several objects and advantages, some of which may be summarized as follows: Accommodation of a plurality of components of various dimensions in any selected sequence in a stable, vertical stack of components; placement of each component in the stack such that the front panels of all of the components are flush with one another, thereby creating an aesthetically pleasing, as well as a functional stack; enabling a choice in the sequence and in the spacing from one another of adjacent components in the stack, thereby allowing for the circulation of cooler air between the components and the dissipation of heat during operation of the components; stabilizing the stack and enabling the creation of a stack with more individual components; simplified and economical construction which is easy to install and use and provides a pleasing appearance; ease of rearrangement of the components in a stack and ease of substitution of components in the stack, as desired, for repair or replacement of selected components; and ease of manufacture in large quantities of consistent, high quality.

The above objects and advantages, as well as further objects and advantages, are attained by the present invention which may be described briefly as providing an improvement in a support rail system for use in supporting individual components, such as audio and video components, in a vertical stack of upper and lower components, each component having a front panel, an opposite rear end spaced longitudinally a given distance from the front panel, laterally spaced apart sides, and an altitudinally spaced apart top and bottom, at least the upper component including a forward location and a rearward location along the bottom thereof, the upper component having a center of gravity lying between the forward location and the rearward location, the support rail system enabling stacking of the components one over the other with the respective front panels aligned essentially flush with one another in a generally vertical plane, the improvement comprising: a support rail for placement between adjacent upper and lower components in the stack so as to rest upon the lower component and support the upper component thereon, the support rail including a lower basal portion for resting upon the top of the lower component, the basal portion having a given longitudinal extent for resting upon a corresponding underlying portion of the top of the lower component, and an upper platform extending longitudinally along the support rail and having a longitudinal length greater than the given longitudinal extent of the basal portion and at least as great as the longitudinal distance between the forward location and the rearward location so that with the support rail aligned longitudinally, both the forward location and the rearward location on the upper component will rest simultaneously on the platform such that the upper component will be supported upon the support rail, and the support rail, in turn, will be supported by the underlying portion of the top of the lower component lying beneath the basal portion of the support rail.

The invention will be understood more fully, while still further objects and advantages will become apparent, in the following detailed description of a preferred embodiment of the invention illustrated in the accompanying drawing, in which.

Figure 1:
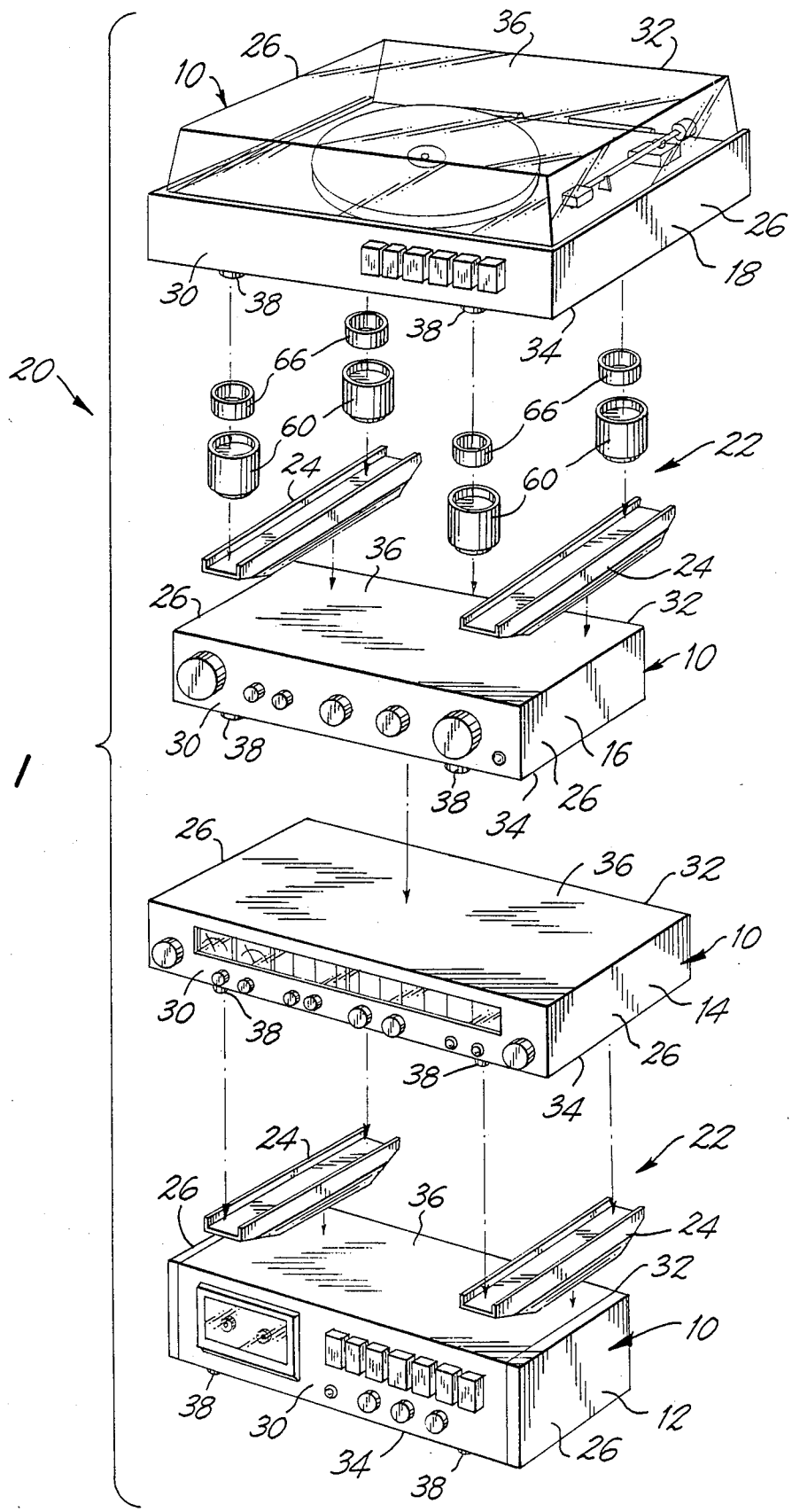
FIG. 1 is an exploded perspective view of a stack of components utilizing a support rail system constructed in accordance with the present invention.
Figure 2:
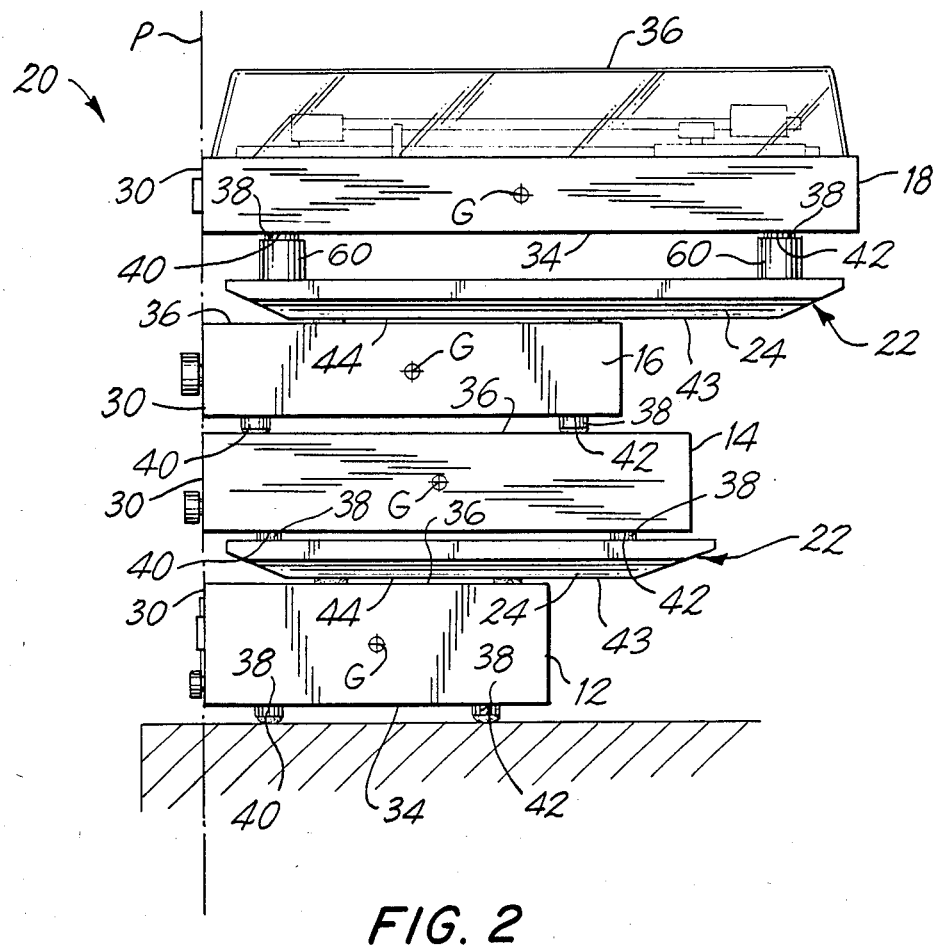
FIG. 2 is a side elevational view of the stack.
Figure 3:
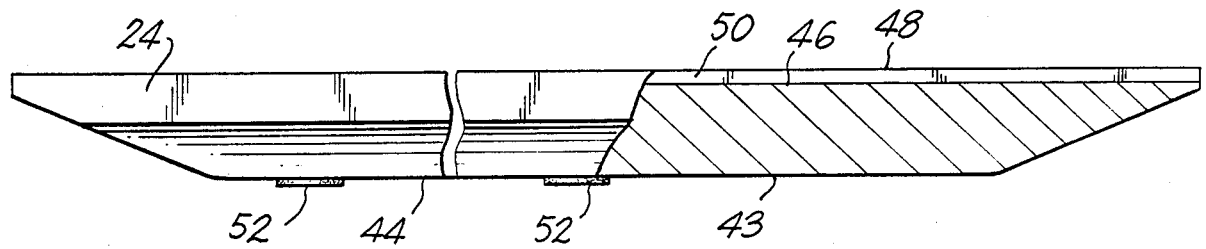
FIG. 3 is a side elevational view, partially sectioned, of a support rail of the system of the invention.
Figure 4:
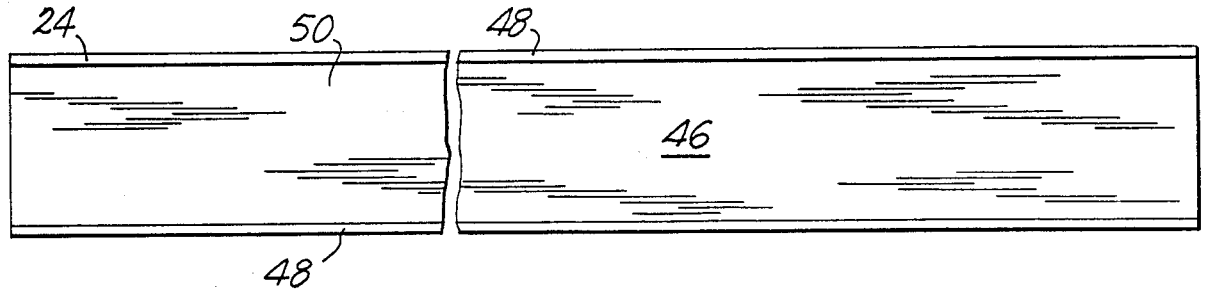
FIG. 4 is a top plan view of the support rail.
Figure 5:
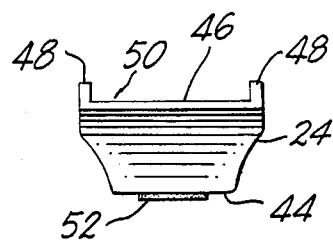
FIG. 5 is a front elevational view of the support rail.
Figure 6:
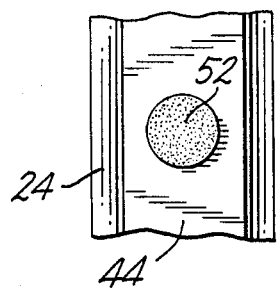
FIG. 6 is a fragmentary bottom plan view of the support rail.

Referring now to the drawing, and especially to FIG. 1 thereof, a plurality of components 10, shown in the form of audio components including an audio tape player 12, a tuner 14, an amplifier 16 and a turntable 18, are to be arranged in a vertical stack 20, by being arranged in a vertical array, stacked upon one another, with the assistance of support rail systems 22 constructed in accordance with the invention. In the illustrated stack 20, each support rail system 22 includes a pair of support rails 24 for supporting the corresponding components 10 in a stable, aesthetically pleasing vertical array so as to establish a home audio entertainment center, as depicted in FIG. 2. The components 10 are selected from a wide variety of available components, usually without regard to the various dimensions in which the components are constructed. Thus, for example, while it is somewhat likely that the components 10 will have similar lateral widths, that is, the lateral distance between the sides 26 of the components 10 will be similar, the longitudinal depth of the different components 10, that is, the longitudinal distance between the front panel 30 and the rear end 32 of each component 10, is likely to be considerably different among the various components. Usually, these components are installed with the components resting upon individual shelves or secured within a rack so that the depth of the components is relatively unimportant. However, in the stack 20 each upper component rests upon the next adjacent lower component itself and the front-to-back dimensions of the individual components become critical in choosing the sequence of components in a stack. Support rail system 22 enables more flexibility in the choice of the order of components in stack 20.

As best seen in FIG. 2, the sequence of components 10 in stack 20 has been selected so that the tape player 12 is the lowermost component in the stack, the tuner 14 is the next adjacent upper component, the amplifier 16 rests upon the tuner 14, and the uppermost component in the stack is the turntable 18. The particular order of components 10 in stack 20 has been selected by the user as a matter of choice, either for appearance or for convenience of operation, or for other functional or aesthetic reasons. Each component 10 has a bottom 34 and a top 36 spaced altitudinally from the bottom 34. A plurality of feet 38 depend from the bottom 34 of each component 10 and the feet 38 are arranged in a forward pair placed at a forward location 40 and a rearward pair placed at a rearward location 42. Each component 10 has a center of gravity G placed between the corresponding forward and rearward locations 40 and 42.

From an aesthetic as well as a functional standpoint, it is desirable that the front panels 30 of all of the components 10 in the stack 20 be aligned essentially flush with one another, that is, all of the front panels 30 should lie essentially in the same vertical plane P. However, because of the various front-to-back dimensions and the corresponding different longitudinal spacing between the forward and rearward locations 40 and 42 and the depending pairs of feet 38, it is not feasible, in all cases, to rest the feet 38 of an upper component directly upon the next lower component and still attain any desired sequence of components in the stack 20. Thus, as seen in FIG. 2, while the feet 38 of the amplifier 16 can rest directly upon the top 36 of the tuner 14, due to the relative dimensions of these two components, the relative front-to-back dimensions of the tuner 14 and tape player 12, and the turntable 18 and the amplifier 16, are such that the spacing between the forward and rearward feet 38 will not permit the rearward feet 38 of an upper component to rest directly upon the top 36 of the next lower component when the front panels 30 are flush with one another. In order to enable the desired stacking with the front panels 30 all flush with one another, a support rail system 22 is interposed between the tape player 12 and the tuner 14, and between the amplifier 16 and the turntable 18. In this manner, the tuner 14 rests upon the rails 24 of support system 22, which rails 24, in turn, rest upon the top 36 of the tape player 12. In a similar manner, another pair of rails 24 serve to support the turntable 18 on the top 36 of the amplifier 16.

Turning now to FIGS. 3, 4, 5 and 6, as well as to FIGS. 1 and 2, the support rails 24 of support rail system 22 each include a lower basal surface 43, having a basal portion 44, and an upper platform 46. The upper platform 46 extends longitudinally along the rail 24 well beyond the longitudinal extent of the basal portion 44 and has a length at least as great as the longitudinal distance between the forward location 40 and the rearward location 42 of the component 10 to be supported upon the rail 24, so that each of the feet 38 of that component will rest upon a rail 24. A fence 48 extends longitudinally along each side of the rail 24 and the fences 48 project altitudinally upwardly from the platform 46 so that the platform 46 and the fences 48 establish a channel 50 within which the feet 38 of the supported component 10 are confined against lateral movement off the platform 46, thereby providing a high degree of lateral stability in the stack 20, while enabling ease of movement of the components longitudinally relative to one another for placement in the desired front panel flush positions.

As best seen in FIGS. 1 and 2, a pair of rails 24 is interposed between the tape player 12 and the tuner 14, with the basal portions 44 of the basal surfaces 43 juxtaposed with the top 36 of the tape player 12 and the channels 50 extending longitudinally well beyond the basal portions 44 so as to be available to receive within the channels 50 all of the feet 38 depending from the bottom 34 of the tuner 14. The front panels 30 of both the tuner 14 and the tape player 12 are flush with one another, in the desired stacked position. Because of the differences in the front-to-back dimensions of the these components, the tuner 14 extends back farther than the tape player 12, to the point where the rearward location 42 of the tuner 14 is positioned back beyond the rear end 32 of the tape player 12. Ordinarily, such a condition would leave the rear feet 38 of the tuner 14 without a purchase, and consequently without support; however, rails 24 extend back beyond the top 36 of the tape player 12, and beyond the rear end 32 thereof, so that the rear feet 38 of the tuner 14 are supported within the channel 50 of each rail 24. With both the front and rear feet 38 of the tuner 14 placed within a channel 50 of a rail 24, the pair of rails 24 interposed between the tuner 14 and the tape player 12 provide a stable, full support for the tuner 14 upon the tape player 12. Preferably, the basal portions 44 of the rails 24 are provided with some means for deterring movement of the rails 24 relative to the top 36 of the tape player 12 when the tuner 14 is in place. Thus, each rail 24 is provided with pads 52 of a resilient material, such as an elastomer, which pads 52 not only provide a frictional grip upon the surface of the top 36 of the tape player 12, but also protect against marring of that surface.

It as noted that the center of gravity G of the tuner 14 is located longitudinally within the bounds of the underlying top 36 of the tape player 12, and, in this instance, between the pads 52 on the basal portion 44 of the rails 24, to assure stability in the stack 20. It is pointed out, however, that such a relationship may not be essential where the weight distribution of other components in the stack 20 is such that stability is otherwise assured. For example, in the illustrated stack 20, amplifier 16, which is a relatively heavy component, has dimensions which place the center of gravity G of the amplifier 16 forward of the center of gravity G of the tuner 14, thereby placing the effect of the combined weight of the amplifier 16 and the tuner 14 well within the bounds of the top 36 of the tape player 12 and enhancing the stability of the stack.

With respect to amplifier 16, it is noted that since the forward location 40 and the rearward location 42 on the amplifier 16 are well within the bounds of the top 36 of the tuner 14, the tuner 14 itself provides an adequate purchase for the feet 38 of the amplifier 16, and no support rail system 22 need be interposed between the amplifier 16 and the tuner 14. However, turntable 18 does extend longitudinally back well beyond the top 36 of the amplifier 16, and a second pair of rails 24 is interposed between the turntable 18 and the amplifier 16 to provide a stable purchase for the feet 38 of the turntable 18 in much the same manner as described above in connection with the support of tuner 14 upon tape player 12. Rails 24 are provided with a longitudinal length suitable for use with components of various front-to-back dimensions and may be supplied in different lengths for use with components of different dimensions, as shown in the difference between the lengths of the illustrated first and second pairs of rails 24.

Figure 7:
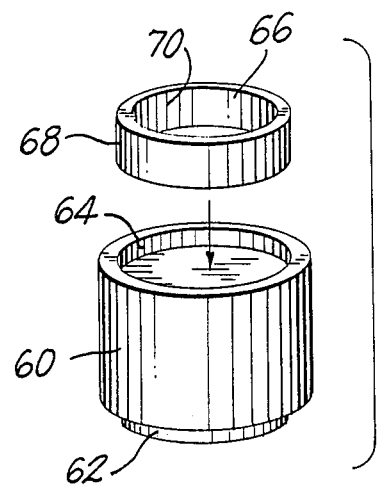
FIG. 7 is an exploded perspective view of a spacer and an adapter for use in connection with the support rail.
Figure 8:
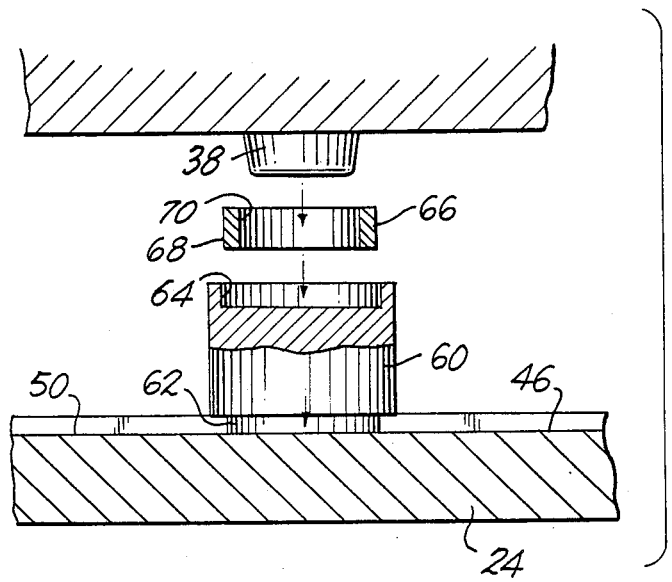
FIG. 8 is a fragmentary side elevational view, partially sectioned, of the support rail illustrating the use of the spacer and the adapter.

In view of the nature of the amplifier 16 and the tendency of the amplifier 16 to generate greater amounts of heat during use, it is desirable to provide for the dissipation of excessive heat by enhancing the ability to circulate cooling air adjacent the component. Thus, support rail system 22 may be provided with spacers 60 which raise the turntable 18 in the stack 20, relative to the amplifier 16, and increase the distance between the top 36 of the amplifier 16 and the bottom 34 of the turntable 18, so as to enable better dissipation of heat from the amplifier 16. Referring now to FIGS. 7 and 8, each spacer 60 is seen to have a generally cylindrical configuration and includes a downward projection 62 having a diameter essentially complementary to the lateral extent of the channel 50 so as to be fitted more-or-less precisely into the channel 50. A cylindrical recess 64 at the upper end of the spacer 60 has a diameter similar to that of the projection 62 and will receive a complementary foot 38 of the component 10 to be supported by the spacers 60. Where the foot 38 may have a diameter significantly smaller than that of the recess 64, an adapter 66 is employed to assure that the smaller diameter foot 38 is confined appropriately within the recess 64, against any significant amount of relative lateral movement. Adapter 66 is in the form of a ring including an outer periphery 68 which fits closely within recess 64 and provides an inner opening 70 for the reception of the smaller diameter foot 38. It is noted that projection 62 is complementary to recess 64 so that a series of spacers 60 may be interengaged with one another for adjustment of the altitudinal spacing between adjacent components in a stack, utilizing a plurality of spacers 60.

The support rails 24 may be constructed of any one of a variety of materials having the appropriate strength and rigidity. Support rails 24 of wood have been found to be suitable from the standpoint of structural strength and are aesthetically quite pleasing. Other materials, such as extruded or cast metals and molded synthetic resins are feasible. The spacers 60 and adapters 66 readily are constructed of the same materials. While the support rails 24 are illustrated as being solid, perforated structures may be utilized to enhance the circulation of air to the components in the stack for cooling purposes. Counterweights may be incorporated into the support rails, adjacent the forward ends thereof, to counterbalance the weight of a supported component.

It will be seen that the support rail system 22 provides a relatively simple, yet highly effective means for stacking a plurality of components in a stable vertical stack, with the components located relative to one another in a desired front panel flush position. The components may be placed in almost any desired sequence in the stack, since the various front-to-back dimensions are compensated for by the use of the support rails 24 of the system. Those components which generate a relatively greater amount of heat, such as amplifiers and receivers, can be placed more toward the top of the stack so that the heat need not rise through an entire stack of components, thereby enhancing the operation and reliability of the components in the stack. The system of the invention provides greater ease in the removal and the substitution or replacement of a component in a stack with minimal disruption to the stack. Overall, the system provides a compact, neat and otherwise aesthetically pleasing arrangement of components with effectiveness and economy.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. In the combination which includes individual components, such as audio and video components, in a vertical stack of upper and lower components, each component having a front panel, an opposite rear end spaced longitudinally a given distance from the front panel, laterally spaced apart sides, and an altitudinally spaced apart top and bottom, at least the upper component including a forward location and a rearward location along the bottom thereof, the upper component having a center of gravity lying between the forward location and the rearward location, and a support rail system for stacking the components one over the other with the respective front panels aligned essentially flush with one another in a generally vertical plane, the improvement comprising: a support rail for placement between adjacent upper and lower components in the stack so as to rest upon the lower component and support the upper component thereon, the support rail including a lower basal portion for resting upon the top of the lower component, the basal portion having a given longitudinal extent for resting upon a corresponding underlying portion of the top of the lower component, and an upper platform extending longitudinally along the support rail and having a longitudinal length greater than the given longitudinal extent of the basal portion and at least as great as the longitudinal distance between the forward location and the rearward location so that with the support rail aligned longitudinally, both the forward location and the rearward location on the upper component will rest simultaneously on the platform such that the upper component will be supported upon the support rail, and the support rail, in turn, will be supported by the under lying portion of the top of the lower component lying beneath the basal portion of the support rail.

2. The invention of claim 1 wherein the upper component includes support feet depending from the bottom thereof, at least one support foot being located at the forward location and at least one support foot being located at the rearward location, and the support rail includes lateral confining means located longitudinally along the upper platform such that the support feet will rest simultaneously on the platform, confined by the lateral confining means against movement off the support rail in lateral directions.

3. The invention of claim 2 wherein the lateral confining means includes laterally opposite fences projecting altitudinally upwardly longitudinally along the upper platform and establishing a channel extending longitudinally along the support rail such that the support feet will rest simultaneously in the channel, confined within the channel against movement off the support rail in lateral directions.

4. The invention of claim 3 including spacers, each spacer having a lower end generally complementary to the channel for placement therein, confined against lateral movement relative to the support rail, and an upper end including a recess for receiving a depending support foot of the upper component.

5. The invention of claim 4 including adapters, each adapter having an outer periphery generally complementary to the recess in the spacer and an inner opening generally complementary to the depending support foot of the upper component.

6. The invention of claim 1 including means on the basal surface portion for deterring movement of the support rail relative to the top of the lower component.

7. The invention of claim 6 wherein said means on the basal surface portion includes pads of resilient material.

8. In combination, individual components, such as audio and video components, in a vertical stack of upper and lower components, each component having a front panel, an opposite rear end spaced longitudinally a given distance from the ®front panel, laterally spaced apart sides, and an altitudinally spaced apart top and bottom, at least the upper component including a forward location and a rearward location along the bottom thereof, the upper component having a center of gravity lying between the forward location and the rearward location, and a support rail system for stacking the components one over the other with the respective front panels aligned essentially flush with one another in a generally vertical plane, the support rail system comprising: a pair of support rails for placement between adjacent upper and lower components in the stack so as to rest upon the lower component and support the upper component thereon, the support rails each including a lower basal portion for resting upon the top of the lower component, the basal portion having a given longitudinal extent for resting upon a corresponding underlying portion of the top of the lower component, and an upper platform extending longitudinally along the support rail and having a longitudinal length greater than the given longitudinal extent of the basal portion and at least as great as the longitudinal distance between the forward location and the rearward location so that with the support rails spaced apart laterally and each support rail aligned longitudinally, both the forward location and the rearward location on the upper component will rest simultaneously on the platforms such that the upper component will be supported upon the support rails, and the support rails, in turn, will be supported by the underlying portion of the top of the lower component lying beneath the basal portions of the support rails.

9. The invention of claim 8 wherein the upper component includes support feet depending from the bottom thereof, at least one first pair of support feet being located at the forward location and at least one second pair of support feet being located at the rearward location, and the support rails include lateral confining means along the upper platform of each support rail such that one of the support feet of each of said first and second pairs of support feet will rest simultaneously on the platform of one of the support rails, confined by the lateral confining means against movement off the support rail in lateral directions.

10. The invention of claim 9 wherein the lateral confining means includes laterally opposite fences projecting altitudinally upwardly longitudinally along the upper platform of each support rail and establishing a channel extending longitudinally along the support rail such that one of the support feet of each of said first and second pairs of support feet will rest simultaneously in the channel of one of the support rails, confined within the channel against movement off the support rail in lateral directions.

11. The invention of claim 10 including spacers, each spacer having a lower end generally complementary to the channel for placement therein, confined against lateral movement relative to the support rail, and an upper end including a recess for receiving a depending support foot of the upper component.

12. The invention of claim 11 including adapters, each adapter having an outer periphery generally complementary to the recess in the spacer and an inner opening generally complementary to the depending support foot of the upper component.

13. The invention of claim 8 including means on the basal surface portion of each support rail for deterring movement of the support rail relative to the top of the lower component.

14. The invention of claim 13 wherein said means on the basal surface portion includes pads of resilient material.

15. In a support rail system for use in supporting individual components, such as audio and video components, in a vertical stack of upper and lower components, each component having a front panel, an opposite rear end spaced longitudinally a given distance from the front panel, laterally spaced apart sides, and an altitudinally spaced apart top and bottom, at least the upper component including a forward location and a rearward location along the bottom thereof, the upper component having a center of gravity lying between the forward location and the rearward location and support feet depending from the bottom thereof, at least one support foot being located at the forward location and at least one support foot being located at the rearward location, the support rail system enabling stacking of the components one over the other with the respective front panels aligned essentially flush with one another in a generally vertical plane, the improvement comprising: a support rail for placement between adjacent upper and lower components in the stack so as to rest upon the lower component and support the upper component thereon, the support rail including a lower basal portion for resting upon the top of the lower component, the basal portion having a given longitudinal extent for resting upon a corresponding underlying portion of the top of the lower component, an upper platform extending longitudinally along the support rail and having a longitudinal length greater than the given longitudinal extent of the basal portion and at least as great as the longitudinal distance between the forward location and the rearward location so that with the support rail aligned longitudinally, both the forward location and the rearward location on the upper component will rest simultaneously on the platform such that the upper component will be supported upon the support rail, and the support rail, in turn, will be supported by the underlying portion of the top of the lower component lying beneath the basal portion of the support rail, lateral confining means located longitudinally along the upper platform such that the support feet will rest simultaneously on the platform, confined by the lateral confining means against movement off the support rail in lateral directions, the lateral confining means including laterally opposite fences projecting altitudinally upwardly longitudinally along the upper platform and establishing a channel extending longitudinally along the support rail such that the support feet will rest simultaneously in the channel, confined within the channel against movement off the support rail in lateral directions, and spacers, each spacer having a lower end generally complementary to the channel for placement therein, confined against lateral movement relative to the support rail, and an upper end including a recess for receiving a depending support foot of the upper component.

16. The invention of claim 15 including adapters, each adapter having an outer periphery generally complementary to the recess in the spacer and an inner opening generally complementary to the depending support foot of the upper component.

17. A support rail system for use in supporting individual components, such as audio and video components, in a vertical stack of upper and lower components, each component having a front panel, an opposite rear end spaced longitudinally a given distance from the front panel, laterally spaced apart sides, and an altitudinally spaced apart top and bottom, at least the upper component including a forward location and a rearward location along the bottom thereof, the upper component having a center of gravity lying between the forward location and the rearward location and support feet depending from the bottom thereof, at least one first pair of support feet being located at the forward location and at least one second pair of support feet being located at the rearward location, the support rail system enabling stacking of the components one over the other with the respective front panels aligned essentially flush with one another in a generally vertical plane, the support rail system comprising: a pair of support rails for placement between adjacent upper and lower components in the stack so as to rest upon the lower component and support the upper component thereon, the support rails each including a lower basal portion for resting upon the top of the lower component, the basal portion having a given longitudinal extent for resting upon a corresponding underlying portion of the top of the lower component, an upper platform extending longitudinally along the support rail and having a longitudinal length greater than the given longitudinal extent of the basal portion and at least as great as the longitudinal distance between the forward location and the rearward location so that with the support rails spaced apart laterally and each support rail aligned longitudinally, both the forward location and the rearward location on the upper component will rest simultaneously on the platforms such that the upper component will be supported upon the support rails, and the support rails, in turn, will be supported by the underlying portion of the top of the lower component lying beneath the basal portions of the support rails, the support rails including lateral confining means along the upper platform of each support rail such that one of the support feet of each of said first and second pairs of support feet will rest simultaneously on the platform of one of the support rails, confined by the lateral confining means against movement off the support rail in lateral directions, the lateral confining means including laterally along the upper platform of each support rail and establishing a channel extending longitudinally along the support rail such that one of the support feet of each of said first and second pairs of support feet will rest simultaneously in the channel of one of the support rails, confined within the channel against movement off the support railing lateral directions, and spacers, each spacer having a lower end generally complementary to the channel for placement therein, confined against lateral movement relative to the support rail, and an upper end including a recess for receiving a depending support foot of the upper component.

18. The invention of claim 17 including adapters, each adapter having an outer periphery generally complementary to the recess in the spacer and an inner opening generally complementary to the depending support foot of the upper component.

* * * * *